May 3, 1938.   R. T. AXE   2,115,698
WINDOW STRUCTURE FOR VEHICLES
Filed April 14, 1936   2 Sheets-Sheet 2
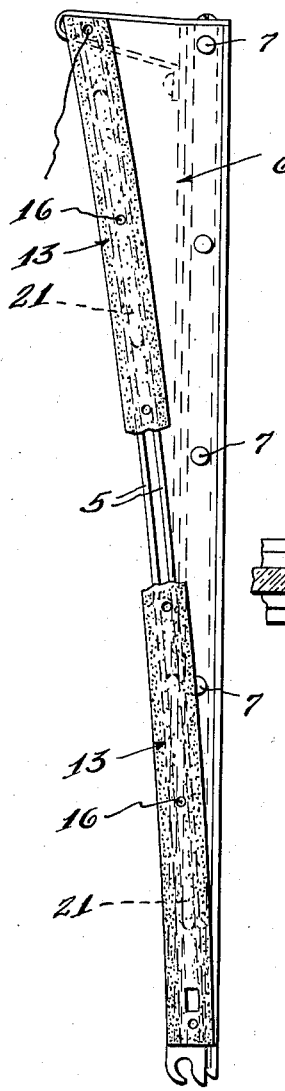
Fig-3-
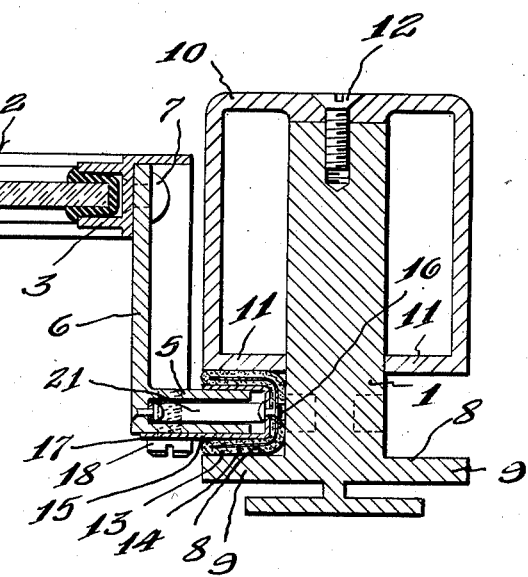
Fig-4-
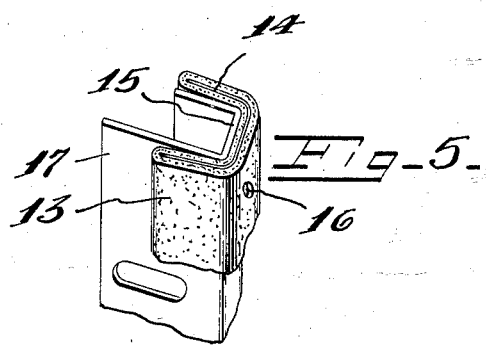
Fig-5-
INVENTOR.
Roy T. Axe
BY Rodell & Thompson
ATTORNEYS.

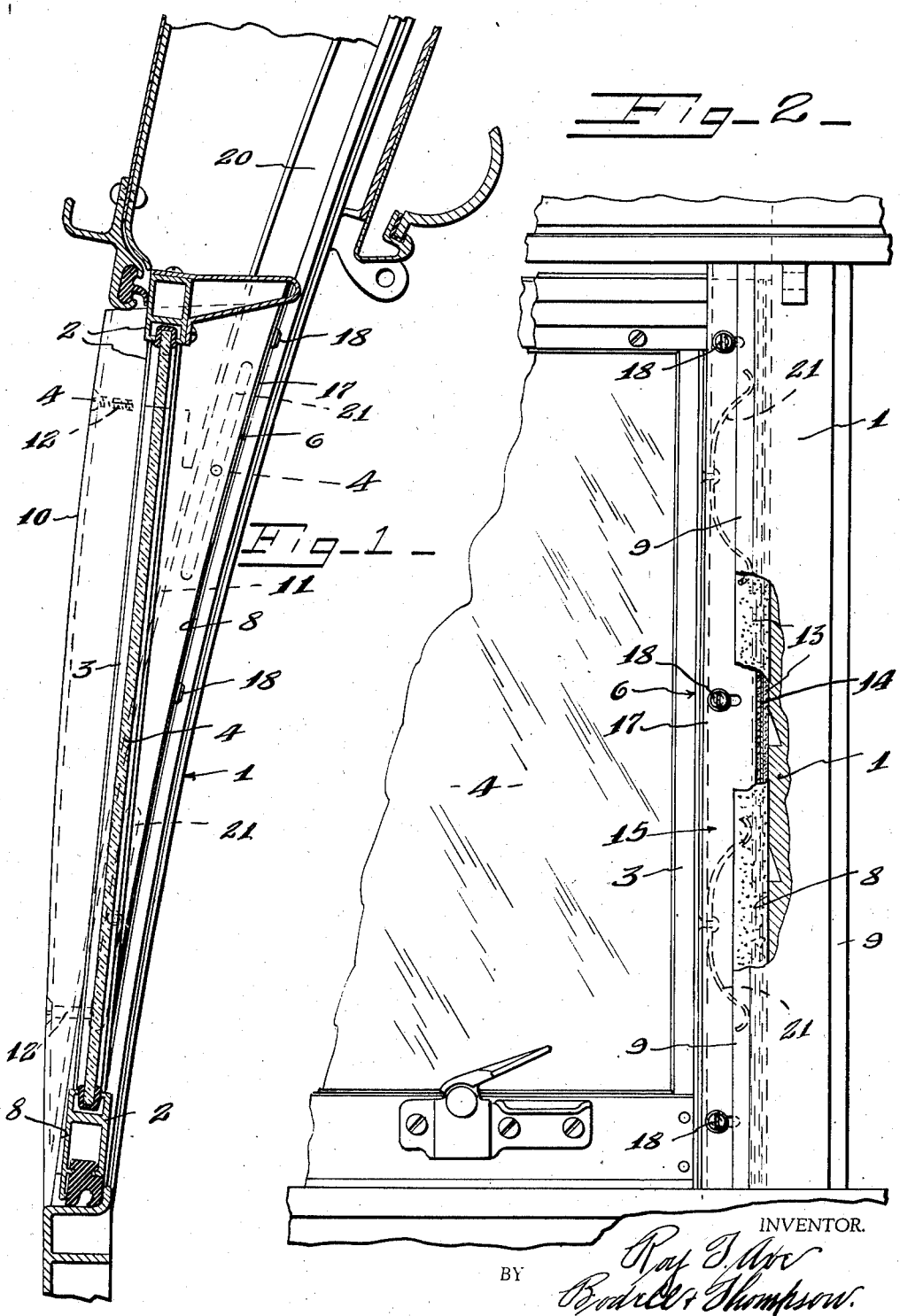

Patented May 3, 1938

2,115,698

UNITED STATES PATENT OFFICE 2,115,698

WINDOW STRUCTURE FOR VEHICLES

Roy T. Axe, Syracuse, N. Y., assignor to The O. M. Edwards Company, Inc., Syracuse, N. Y., a corporation of New York Application April 14, 1936, Serial No. 74,334

8 Claims. (Cl. 189—73)

This invention relates to window structures, particularly structures for motor vehicles, as buses, and has for its object a simple and economical guide means for guiding the sash in its raising and lowering movement, which guide means includes slidably interfitting parts, as a rib and channel, and a fibrous weather strip movable with the sash and adjustable in a widthwise direction relatively to the sash, and particularly, means for effecting such widthwise adjustment.

It further has for its object an adjusting means for the weather strip which comprises a metal U-shaped carrier for the weather strip, which carrier is movable with the sash and embraces and is adjustable edgewise of a guide rib of a sash guide which includes an interfitting rib and channel.

It further has for its object a guide means for the sash in which the rib is carried by the sash and the carrier strip U-shaped in general form in cross section is arranged astride the rib with one side of the U-formation longer than the other, in order to extend out of the channel and be adjustably secured to the rib, together with means for coacting with the rib and the exposed portion to hold the carrier strip in its widthwise adjusted position.

It further has for its object a guide means particularly adapted for guiding substantially flat sashes in an arcuate path during raising and lowering of the sash.

The invention consists in the novel features and in the combinations and constructions hereinafter set forth and claimed.

Figure 1 is a fragmentary vertical sectional view of a window structure embodying this invention.

Figure 2 is a fragmentary elevation partly broken away.

Figure 3 is a face view of one of the guide plates at each edge of the sash.

Figure 4 is an enlarged sectional view on line 4—4, Figure 1.

Figure 5 is an enlarged fragmentary perspective view of the carrier strip for the U-shaped weather strip.

The window structure comprises a suitable frame enclosing a window opening, which frame includes a post structure, designated generally 1. 2 designates the sash, this comprising a marginal frame including stiles 3 having a suitable channel for receiving the margins of the glass pane 4.

In the illustrated embodiment of my invention, the guide means includes slidably interfitting parts on the sash frame or post structure, which parts include a channel and a rib in the channel, and in addition, a fibrous U-shaped weather strip located in the channel and embracing the rib and movable with the sash, the U-shaped fibrous strip being carried by a metal carrier strip, which is U-shaped in general form in cross section, and carried by the sash but also adjustable in a direction widthwise of the sash. This carrier strip and its adjustment constitutes the essential feature of this invention.

In the illustrated embodiment of this invention, the rib is movable with the sash and the channel formed in the post structure.

5 designates the rib which is carried by a base plate 6 secured at one edge, as at 7, to the edge of each stile 3, the plate extending to one side of the sash, so that the rib 5 is offset from the plane of the sash. The rib 5, as well as the channel in which it extends, is arcuate and is offset from the flat sash. The base plate 6 and rib 5 are preferably formed of extruded metal and the rib 5 formed bifurcated or hollow or with a channel opening through the edge of the rib.

8 designates the channel formed in the post structure 1. This post structure 1 includes a suitable central body recessed in opposite sides thereof to form an outer window stop 9, which is one side of the channel 8 and a hollow removable cover portion 10 embracing the central portion and having a wall 11 forming the opposite side of the channel 8. The removable or cover portion 10 is detachably secured to the body of the post structure 1, as by screws 12. It is removable for the purpose of permitting removal and replacement of the sash. The post structure here shown is designed to be arranged between two window openings, and is therefore provided with channels 8 on opposite sides thereof.

13 designates a fibrous U-shaped weather strip substantially filling the channel 8 and embracing the portion of the rib 5 extending into the channel. The weather strip 13 may be of any suitable form, size and construction, it usually having an internal metal backing base 14.

15 is a carrier strip to which the weather strip is secured, as by rivets 16. The carrier strip is metal and U-shaped in general form in cross section and arranged astride and engaged with the rib 5. The carrier strip 15 is adjustable edgewise relatively to the rib 5 in a direction widthwise of the sash and may be secured to the rib 5. One side of the U-shaped carrier strip is formed wider than the other side, as at 17, the wider portion extending out of the channel 8 and out of the weather strip, so that it is exposed and accessible for the purpose of adjusting the carrier strip edgewise relatively to the rib 5. It is held in its adjusted position by screws, as 18, extending through transverse slots in the wide or exposed portion of one side of the channel-shaped carrier strip and threading into the rib 5. Thus, when the sash is mounted in the frame, the widthwise adjustment of the carrier strip may be effected from one side of the sash by loosening the screws 18 and moving the carrier strip edgewise relatively to the rib to the desired position, and again tightening the screws. By reason of this carrier strip, the carrier strip may be readily adjusted widthwise to conform to the spacings of the post structure and misalinement out of the vertical therein.

As seen in Figure 3, the rib is offset from the plane of the sash and diverges away from the sash toward the top thereof, and the rib with the weather strip thereon moves into an extension 20 of the channel of the post structure, as the sash is raised.

In order to effect widthwise adjustment, the screws 18 are loosened and the carrier strip 15 moved transversely inwardly or outwardly, and the screws again tightened. By reason of this structure, the equipment supplier may supply the sash, base plate 6 with rib thereon, weather strip and carrier strip to the body builder and the body builder readily adjusts the sash to the window opening by loosening the screws, adjusting the carrier strip, and again tightening it. It will be understood that the sash is placed in the window opening, when the cover portion 10 of the post structure is removed, and when once placed in position, the cover portion 10 is replaced.

The carrier strip 15 may be automatically adjustable edgewise of the rib 5 in order to automatically adjust the U-shaped weather strip 13 or press it against the walls of the channel 8 in the post structure. To this end, suitable springs 21 may be mounted in the hollow rib 5 or the channel formed therein, the springs pressing against the intermediate part of the U-shaped carrier strip 15, as seen in Figures 2 and 4. The springs 21 thus press the carrier strip outward against the bottom of the channel and automatically effect widthwise adjustment of the sash to the window frame. After the automatic adjustment is effected, it may be made permanent or fixed by tightening the screws 18. If desired, however, the carrier strip 15 may be formed without the exposed portion 17 and the screws 18 eliminated, so that the carrier strip 15 is always free to be automatically adjusted by means of the springs 21. Preferably, however, the screws 18 are utilized and after the adjustment is automatically made by the springs 21, this adjustment is fixed by tightening the screws.

What I claim is:—

1. In combination, a window structure for vehicles comprising a window frame including posts, and a sash mounted in the frame, the sash and the frame having slidably interfitting parts for guiding the sash, one of said parts being a channel and the other a rib extending into the channel, a fibrous U-shaped weather strip embracing the rib and fitting the channel, and means for securing the weather strip to the sash, whereby it moves with the sash, including a metal U-shaped carrier strip arranged astride the rib and to which the weather strip is secured, the carrier strip having one side of the U-formation extending outside of the channel, where it is accessible for adjusting the strip edgewise relatively to the sash.

2. In combination, a window structure for vehicles comprising a window frame including posts, and a sash mounted in the frame, the sash and the frame having slidably interfitting parts for guiding the sash, one of said parts being a channel and the other a rib extending into the channel, a fibrous U-shaped weather strip embracing the rib and fitting the channel, and means for securing the weather strip to the sash, whereby it moves with the sash, including a metal U-shaped carrier strip arranged astride the rib and to which the weather strip is secured, the carrier strip having one side of the U-formation extending outside of the channel, where it is accessible for adjusting the strip edgewise relatively to the sash, and means for securing the portion of the strip outside the channel to the sash and thereby holding the weather strip in its adjusted position.

3. In combination, a window structure for vehicles comprising a window frame and a sash slidably mounted in the frame, the frame being formed with a channel and the sash with a rib extending into the channel, a U-shaped weather strip fitting the channel and embracing the rib, and a carrier strip for the weather strip to which the weather strip is secured, the carrier strip being U-shaped in general form in cross section and arranged astride the rib, one side of the U-formation extending out of the channel along the outer side face of the rib, the carrier strip being shiftable in a direction edgewise of the rib and the sash.

4. In combination, a window structure for vehicles comprising a window frame and a sash slidably mounted in the frame, the frame being formed with a channel and the sash with a rib extending into the channel, a U-shaped weather strip fitting the channel and embracing the rib, and a carrier strip for the weather strip to which the weather strip is secured, the carrier strip being U-shaped in general form in cross section and arranged astride the rib, one side of the U formation extending out of the channel along the outer side face of the rib and exposed on the outer side of the rib, the carrier strip being shiftable in a direction edgewise of the rib and the sash, and means coacting with said exposed portion of the weather strip of the channel for holding the carrier strip and the weather strip in their widthwise adjusted position.

5. In combination, a window structure for vehicles comprising a window frame, a substantially flat sash slidably mounted in the frame, a base plate provided on each sash stile and arranged at an angle to the plane of the sash, an arcuate rib on the base plate and facing toward the post, the post being formed with an arcuate channel into which the rib extends, a fibrous weather strip movable with the rib and fitting the channel, a metal carrier strip to which the weather strip is secured, said carrier strip being U-shaped in general form in cross section with one side of the U formation extending out of the channel and exposed on one of the outer faces of the rib, the carrier strip being adjustable edgewise relatively to the rib, and means coacting with the exposed portion of the carrier strip to hold it and the weather strip in adjusted position.

6. In combination, a window structure for vehicles comprising a window frame including posts, and a sash mounted in the frame, the sash and the frame having slidably interfitting parts for guiding the sash, one of said parts being a channel and the other a rib extending into the channel, the rib being provided with a channel opening through the edge thereof, a fibrous U-shaped weather strip embracing the rib, and springs mounted in the channel and applying outward pressure to the weather strip to press the same into the channel.

7. In combination, a window structure for vehicles comprising a window frame including posts, and a sash mounted in the frame, the sash and the frame having slidably interfitting parts for guiding the sash, one of said parts being a channel and the other a rib extending into the channel, the rib being provided with a channel opening through the edge thereof, a fibrous weather strip embracing the rib and engaging the walls of the channel, a U-shaped carrier strip arranged astride the rib and to which the weather strip is secured, springs mounted in the channel of the weather strip and pressing against the intermediate part of the carrier strip, and thereby applying pressure to the weather strip to press it against the walls of the channel of the post.

8. In combination, a window structure for vehicles comprising a window frame including posts, and a sash mounted in the frame, the sash and the frame having slidably interfitting parts for guiding the sash, one of said parts being a channel and the other a rib extending into the channel, the rib being provided with a channel opening through the edge thereof, a fibrous weather strip embracing the rib and engaging the walls of the channel, a U-shaped carrier strip arranged astride the rib and to which the weather strip is secured, the carrier strip having one side of its U-formation extending outside of and exposed outside of the channel, springs mounted in the channel of the weather strip and pressing against the intermediate part of the carrier strip, and thereby applying pressure to the weather strip to press it against the walls of the channel of the post, and means coacting with the exposed portion of the carrier strip for holding the carrier strip and the weather strip in the position in which it is adjusted by the springs.

ROY T. AXE.